US011294921B2

(12) United States Patent
Srivastav et al.

(10) Patent No.: US 11,294,921 B2
(45) Date of Patent: Apr. 5, 2022

(54) MULTIVARIATE TIME-SERIES DATA SEARCH

(71) Applicant: General Electric Company, Schenectady, NY (US)

(72) Inventors: Abhishek Srivastav, San Ramon, CA (US); Anveshi Charuvaka, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 189 days.

(21) Appl. No.: 16/299,617

(22) Filed: Mar. 12, 2019

(65) Prior Publication Data

US 2020/0293527 A1    Sep. 17, 2020

(51) Int. Cl.
*G06F 16/2458* (2019.01)
*G06F 16/22* (2019.01)
*G06F 16/28* (2019.01)
*G06F 16/25* (2019.01)

(52) U.S. Cl.
CPC ......... *G06F 16/2477* (2019.01); *G06F 16/22* (2019.01); *G06F 16/258* (2019.01); *G06F 16/285* (2019.01)

(58) Field of Classification Search
CPC ..... G06F 16/2477; G06F 16/22; G06F 16/285
See application file for complete search history.

(56) References Cited

U.S. PATENT DOCUMENTS

| | | | | |
|---|---|---|---|---|
| 2006/0265192 | A1* | 11/2006 | Turicchi | G06F 11/3409 702/187 |
| 2012/0303621 | A1* | 11/2012 | Newnham | G06F 16/972 707/737 |
| 2016/0162543 | A1* | 6/2016 | Gustafson | G06F 16/2322 707/756 |
| 2016/0371376 | A1* | 12/2016 | Hassan | G06F 16/24578 |
| 2020/0082013 | A1* | 3/2020 | Triplet | G06K 9/6219 |

* cited by examiner

*Primary Examiner* — Grace Park
(74) *Attorney, Agent, or Firm* — Fitch, Even, Tabin & Flannery LLP

(57) ABSTRACT

The example embodiments are directed to a system and method which can perform a text-based search for a temporal data pattern in time-series data. The text-based search process is significantly faster than a distance measurement-based search performed based on temporal pattern comparisons. In one example, the method may include storing previously recorded temporal patterns of time-series data, determining a set of optimal bin boundaries based on the previously recorded temporal patterns, where the set of optimal bin boundaries divide the observed range of time-series data into a plurality of discrete bins each labeled with a respective symbol, transforming the previously recorded temporal patterns of time-series data into symbol strings based on the set of optimal bin boundaries, where a symbol string is based on data points in the plurality of discrete bins, and storing the symbol strings within a symbol storage.

18 Claims, 8 Drawing Sheets

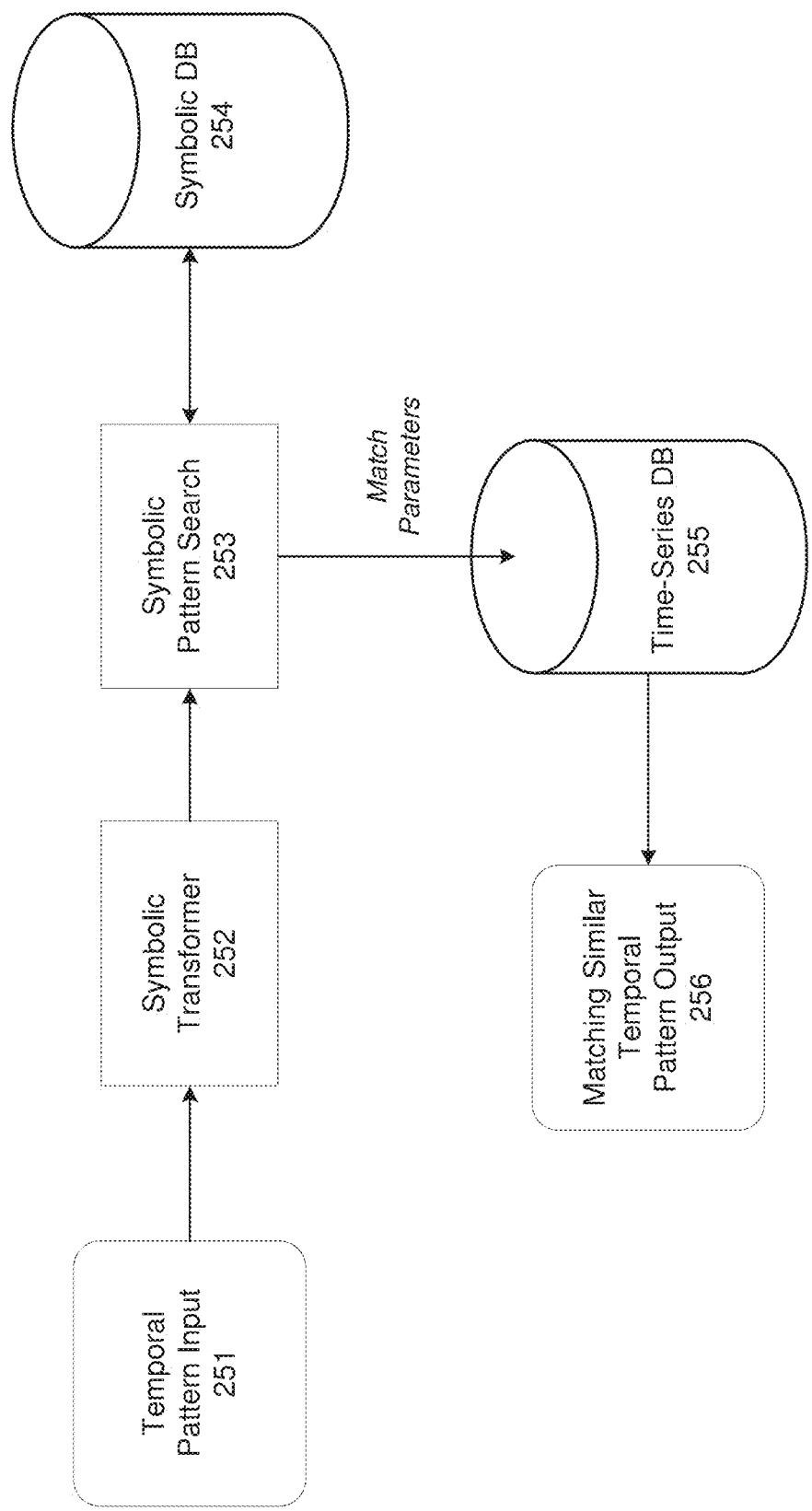

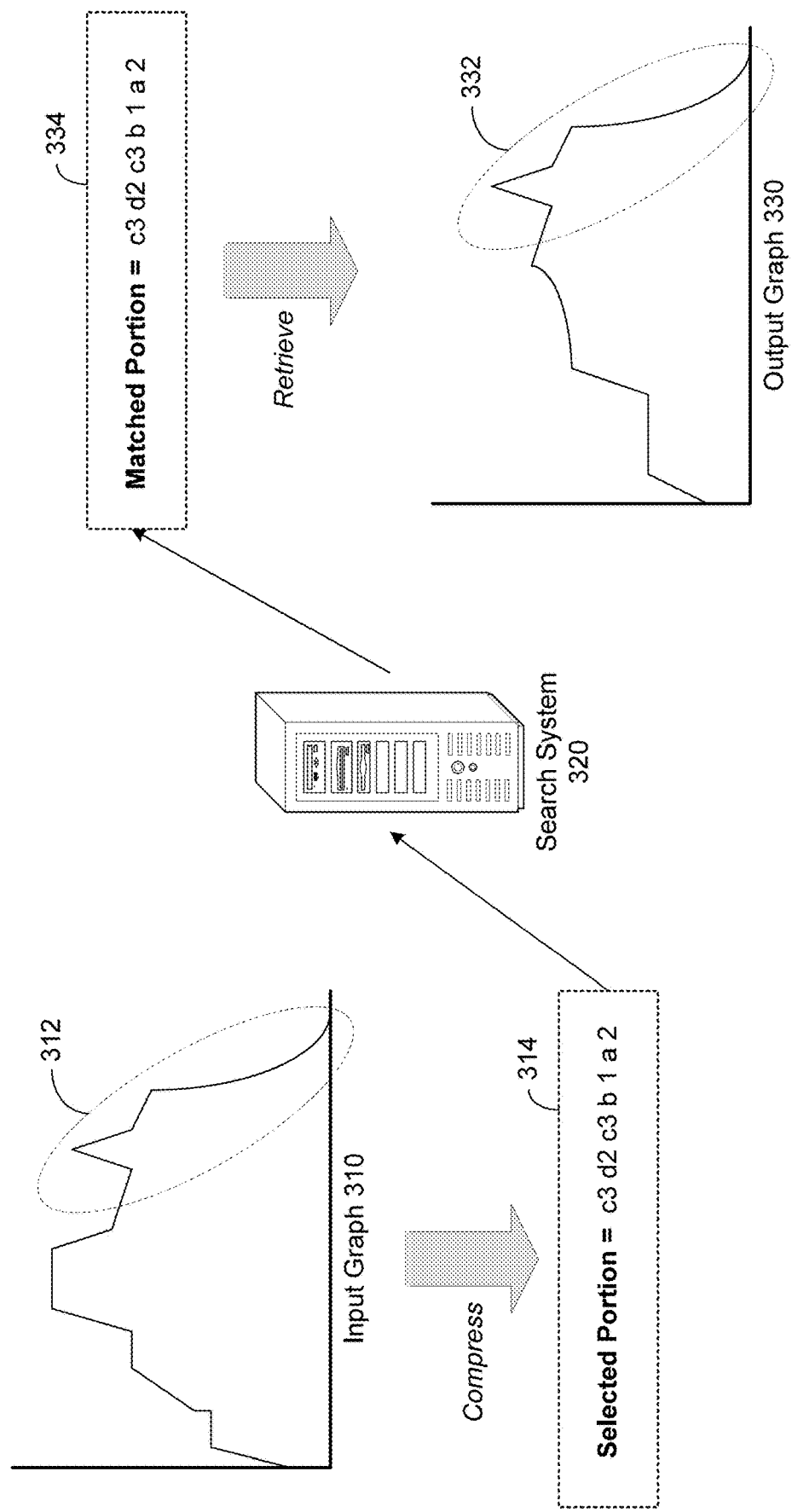

(Multivariate Search)

MULTIVARIATE TIME-SERIES DATA SEARCH

BACKGROUND

Machine and equipment assets are engineered to perform particular tasks as part of a process. For example, assets can include, among other things, industrial manufacturing equipment on a production line, drilling equipment for use in mining operations, wind turbines that generate electricity on a wind farm, transportation vehicles (trains, subways, airplanes, etc.), gas and oil refining equipment, and the like. As another example, assets may include devices that aid in diagnosing patients such as imaging devices (e.g., X-ray or MRI systems), monitoring equipment, and the like.

Low-level software and hardware-based controllers have long been used to drive machine and equipment assets. However, the overwhelming adoption of cloud computing, increasing sensor capabilities, and decreasing sensor costs, as well as the proliferation of mobile technologies, have created opportunities for creating novel industrial and healthcare-based assets with improved sensing technology and which are capable of transmitting data that can then be distributed throughout a network. As a consequence, there are new opportunities to enhance the business value of some assets through the use of novel industrial-focused hardware and software.

IoT sensors that are used to capture time-series data from engineering and industrial assets can generate a significant volume of multivariate time-series data. An operator may seek to gain insight or analyze a temporal pattern in time-series data captured by one or more sensors (e.g., the operational pattern of asset start-up or shut down, a potential fault signature, etc.) In this case, a search may be performed using a query time-series segment to identify segments within previously recorded time-series data readings where the temporal pattern in the historical data matches that of the query segment. Due to their temporal nature, time-series data is harder to search and mine for patterns because not only the data values but also their temporal order is important.

State of the art time-series search processes rely on a distance measure between time-series segments. In this case, the distance of a query time-series segment may be computed from all candidate time-series segments and matches or similar segments may be returned based on the computed distance (e.g., based on a threshold on distance or top k matches for a given integer k.) The distance between the query time-series segment and the candidate time-series segments may be computed using variety of distance measures suited for the problem such as Euclidean distance and Dynamic Time Warping (DTW) distance. In this example, the search process may use the query time-series segment, a distance measure and candidate time-series segments to return time-series segments that are close to the query with respect to the chosen distance metric. However, this process consumes significant computational resources and can be prohibitively slow especially for large datasets with multivariate sensors.

Related search approaches designed for non-temporal data are not suitable here due to the need to preserve the temporal pattern within the query time-series segment. Temporal patterns are easy to describe visually such as a linear or non-linear pattern in a time-series chart but are difficult to codify and abstract, in general. Also, in the multivariate case, the dimension of the query time-series segment is often unknown beforehand as the subset of sensors used for a query and a query-segment length may only be available at run time requiring any abstraction to be flexible and extensible.

Accordingly, what is needed is a system which can quickly and accurately search, mine, and gain quick insights from the of vast amount of time-series data such as from IoT sensors and industrial assets.

SUMMARY

The embodiments herein improve upon the prior art by performing a time-series segment search for a temporal pattern from a sensor (or multiple sensors) using a compression process which transforms a temporal data pattern into a string of symbols. Each symbol may include an identifier (e.g., an alphanumeric letter) and a value (e.g., an alphanumeric number, etc.) Rather than perform a distance measurement calculation in the raw time-series space, the system transforms a temporal pattern into a string of symbols and searches a database of symbol strings corresponding to previous temporal patterns converted by the system. Therefore, the system can perform a text-based search for matching strings rather than perform a distance measurement process for matching temporal patterns. When a matching string of symbols is found, the system may decompress the matched string of symbols to its original temporal pattern, and output information about the temporal pattern to a user interface as a search result.

A time-series data includes a temporally ordered collection of univariate or multivariate data points typically recorded with respective timestamps. In a classic scenario, measured data value may include pressure, temperature, flow rate, velocity, altitude, etc. recorded at different points of time and stored as time-stamped values.

The example embodiments perform a two-stage process of learning optimal parameters of the search system, and, time-series search using these parameters. In some embodiments, the optimal parameters of the search system may be updated or re-learned if or when new time-series data is collected.

The learning stage may involve learning the parameters of a symbolic transformation process for converting raw time-series data to a sequence of symbols. The learning stage may involve multiple steps.

In the first step of symbolic transformation, the system may identify optimal discretization bin boundaries to divide the range of temporal data into several discrete bins, each labeled with a symbol. This optimal discretization may be based on a procedure that utilizes an expected loss function to find bin boundaries that minimize compression loss.

In the second step of symbolic transformation, the bin boundaries may be used to convert raw time-series data to symbol sequences such that each time-series data point gets labeled by the symbol of the bin it falls into.

In this example, the goal of the optimal discretization is to put the bins at locations so as to retain the most amount of original information when the data is converted to symbols via discretization. For example, if data points typically cluster in certain regions of the data range, then more bins may be used in those parts to retain more fidelity. Meanwhile, if less data points are found at other parts of the data-space, less bins may be used. Therefore, making an optimal use of the total vocabulary of symbols.

In the third step of symbolic transformation, the symbol sequences obtained from time-series may be further compressed into a sequence of alphanumeric symbols consisting of an alphanumeric letter and an alphanumeric value. In these compressed sequences, each alphanumeric letter may correspond to the observed symbol in the symbol sequence from the second step of symbolic transformation, and the alphanumeric value may correspond to the contiguous repeat count of that symbol.

In some embodiments, a fourth step of symbolic transformation may be used, where the compressed representation of the time-series data may be scaled along the time axis to increase the flexibility of matching. This abstraction can produce more search results that are similar in nature but are not an exact match.

Once the parameters of the search system have been learned, the symbolic transformer may be used to generate compressed representations of historical time-series data that may be stored in a database for easy search and retrieval.

During the time-series search stage (second stage), an operator may initiate a time-series search by submitting a query time-series segment e.g. via a graphical user interface, or command line interface. When a time-series data segment is received, the previously learned symbolic transformer may be used to transform the query time-series data into a compressed symbolic representation. Once the query time-series data has been transformed into the symbolic domain, a search may be initiated across the compressed historical time-series data to identify similar temporal patterns using a text-based search approach.

In some embodiments, a multivariate time-series search (i.e., with multiple sensor patterns) may be performed. In this example, the system may perform a search similar to the one performed for univariate search with one sensor, but due to multiple sensors, the search may also require the temporal relationship found in the query segment between the multiple sensors to be held within the search results as well.

In an aspect of an example embodiment, a computing system may include a storage configured to store previous temporal patterns of time-series data, and a processor configured to receive a selection of a time-series data, transform the time-series segment into a string of symbols using the symbolic transformer, and identify similar patterns included in a previous time-series dataset stored in the storage based on the string of symbols, wherein the processor is further configured to output visual information about the identified similar pattern for display via a display device.

In an aspect of another example embodiment, a method may include receiving a selection of a time-series data from a displayed visual graph of time-series data, transforming the temporal pattern into a string of symbols using the symbolic transformer, and outputting visual information about the identified similar patterns for display via a display device.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2D is a diagram illustrating a system for performing a time-series pattern search in accordance with example embodiments.

FIG. 3 is a diagram illustrating a search process for a time-series data pattern accordance with an example embodiment.

Figure 1:
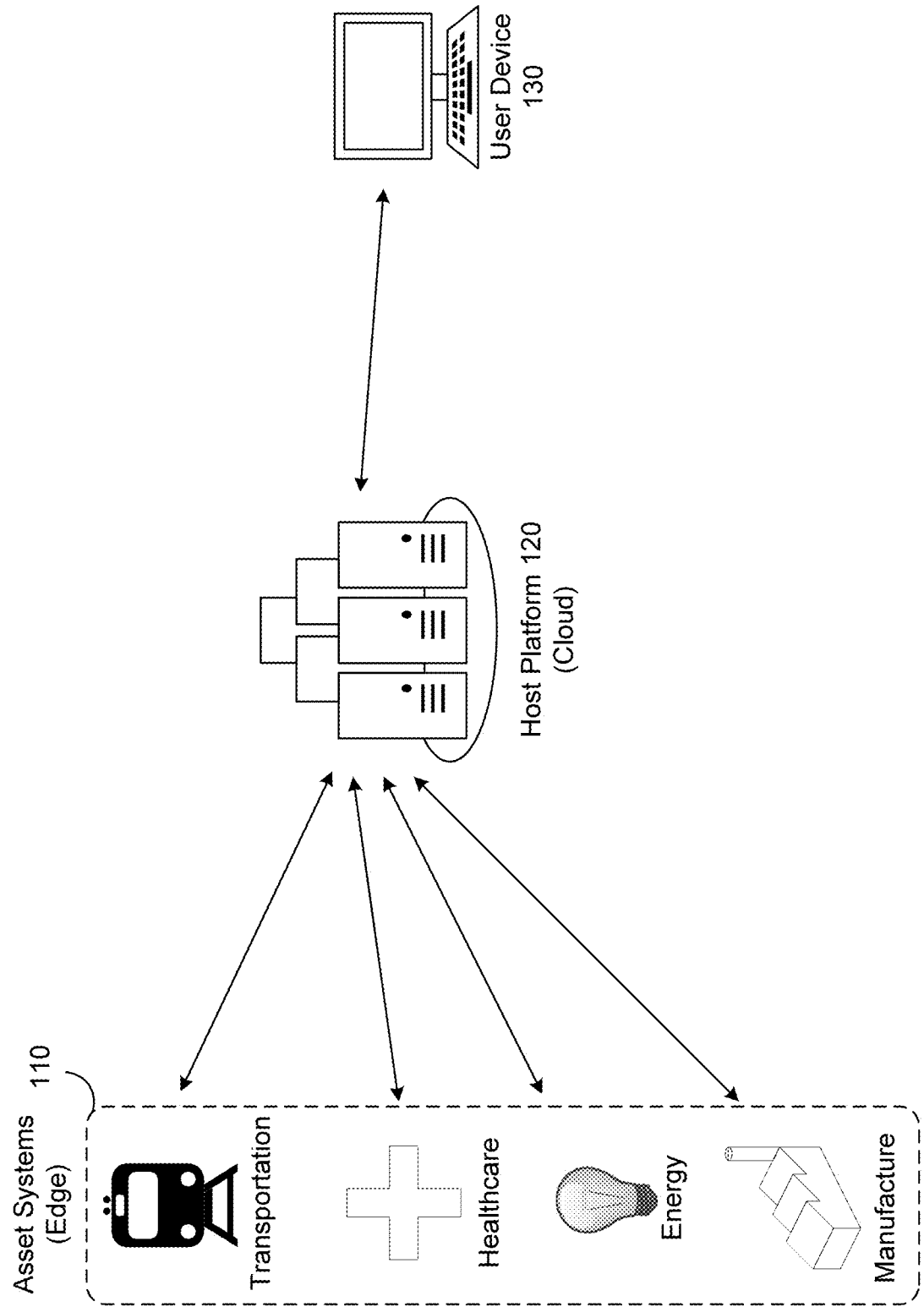
FIG. 1 is a diagram illustrating an industrial cloud computing environment in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Internet of Things (IoT) sensors are often configured to sense time-series data for significant periods of time. Examples of time-series data include temperature, pressure, vibration, velocity, sound, and the like. Often, a user views the captured time-series data via a visual graph which includes a measure of the data (e.g., intensity, amount, etc.) over time. For example, the display may show a line graph providing various patterns as an intensity or amount of the data changes over time.

Recently, sensors have been used to monitor industrial assets and other engineering systems in remote locations which are then fed back to a central platform. There are often situations where an operator may be interested in matching a pattern of time-series data to previously stored data patterns. A traditional search system compares distance measures between time-series segments. In this case, the distance of a query time-series segment may be computed from all candidate time-series segments and matches or similar segments may be returned based on the computed distance. However, this process can consume significant resources. Furthermore, IoT sensors create significantly large volumes of data. Therefore, searching through such data can be time-consuming. Furthermore, the system gets significantly more complicated when performing a multivariate search. In this case, the system must search multiple temporal patterns concurrently creating even bigger need for processing power and compute time.

The example embodiments are directed to a system which can perform a time-series data search (e.g., univariate, multivariate, etc.) using symbolic transformation and text-based search. For example, the system may convert a temporal pattern representing a measured variable over time into a string of symbols based on frequency of data points within the temporal pattern and bin boundaries. The range of time-series data may be divided into discrete bins and data points within each bin may be detected. Furthermore, each bin may be assigned a bin identifier (e.g., alphanumeric letter) and the number of contiguous data points may be represented as the corresponding value (e.g., numerical value). The system may convert a times-series data or a segment of time-series data into a string of symbols where each symbol includes a bin identifier and a value.

At a high level, the process includes two stages. During a first stage (referred to as a learning stage), the system evaluates a set of raw historical time-series temporal patterns in a time-series data store and determines discretization bins for the set. The system may then convert each raw time-series pattern into a compact representation (string of symbols) using the discretizing bins computed earlier. Furthermore, the string of symbols may be stored in a symbol database for further use.

Meanwhile, during a second stage (referred to as a search stage) a user selects or otherwise provides a query in the form of a time-series segment to be searched. Here, the system converts the time-series segment into discretized format for search using the discretization bins determined during the learning stage. Then, the system uses the discretized representation of the search segment to search for matches in the symbol database where the historical time-series patterns converted during the learning stage are stored. In some embodiments, to increase flexibility of the search results, the symbol strings may be scaled along the time axis to allow for matching of similar symbol strings rather than exact matches. When the system identifies a matching (similar) string of symbols, the system may convert the string of symbols back to its raw/original time-series pattern and output information about the retrieved patterns as a search result.

The historical data patterns may be divided into bins based on a function which tries to find the location of the bin boundaries such that the loss is minimal. Here, the goal of the optimal discretization is to put the bins at locations so as to retain the most amount of original information when the data is converted to the symbols via discretization. For example, if data points typically cluster in certain regions of the data range, then more bins may be used in those parts to retain more fidelity. Meanwhile, if less data points are found at other parts of the data-space, less bins may be used. Therefore, making an optimal use of the total vocabulary of symbols. When a new pattern is received (such as a search pattern), the previously determined bin boundaries may be used for the new data pattern.

The system described herein can identify matching temporal patterns in a significantly faster manner than traditional distance measurement searching. Furthermore, the system can scale the string of symbols of the input pattern into an abstract representation and perform the search to identify similar, but not necessarily exact patterns. The level of scale/abstraction can be dynamically defined at run-time by users. Furthermore, when a match is found, the system can retrieve the original temporal pattern of the matching string of symbols and output visual data of the matching pattern via a user interface.

The system described herein is flexible in that underlying abstraction allows for easy specification of query pattern of varying lengths. The system is extensible because it extends naturally to multivariate patterns thus sensor subsets for the query patterns may be defined at run time. The system is composable in that it allows for complex pattern searching via combination of sub-patterns such as temporal pattern 1 followed by temporal pattern 2, etc. The system is scalable in that algorithms are inherently data parallel making the proposed system suitable for large and growing data sets.

In a multivariate example, the user may select a segment of a time-series graph from a first variable, and the system may also detect a corresponding period of time from other variables included in the multivariate data set. Given a multivariate query segment, the system performs the search over multivariate time-series dataset and returns the matched segments found in the database. The system is well-suited for searching through large time-series data sets to return back results with low latency. The system may convert or otherwise compress multivariate time-series data into a plurality of sequences of symbols, which are further compressed and represented as sequences of alphanumeric symbols. Then utilizing a text-based search approach, the query pattern is searched in the compressed representation for low latency and scalable search.

The time-series data may be from an industrial asset, and a segment of the data may be an operating pattern that occurs during a particular event. As a non-limiting example, a power plant operator may be interested in searching for particular vibration pattern. Through the system herein, the operator may search any relevant assets where such a pattern has happened before. As another non-limiting example, a domain expert may identify a signature pattern of time series data which indicates a power failure. In this example, the system can do a search and look for similar patterns in all relevant assets. As another non-limiting example, an operator may search for a particular operational mode pattern (idle time or acceleration period of a car) based on RPMs. The system may search for similar operational patterns on all relevant assets.

Initially, an operator may have a temporal pattern on a user interface which displays a line graph of one or more variables over time. The user may select a portion of the graph or the entire graph as a search query. In response, the system herein may search for previously recorded temporal patterns that have a similar segment.

The system described herein may be implemented via a program or other software that may be used in conjunction with applications for managing machine and equipment assets hosted within an industrial internet of things (IIoT). An IIoT may connect assets, such as turbines, jet engines, locomotives, elevators, healthcare devices, mining equipment, oil and gas refineries, and the like, to the Internet or cloud, or to each other in some meaningful way such as through one or more networks. The cloud can be used to receive, relay, transmit, store, analyze, or otherwise process information for or about assets and manufacturing sites. In an example, a cloud computing system includes at least one processor circuit, at least one database, and a plurality of users and/or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

Assets may be outfitted with one or more sensors (e.g., physical sensors, virtual sensors, etc.) configured to monitor respective operations or conditions of the asset and the environment in which the asset operates. Data from the sensors can be recorded or transmitted to a cloud-based or other remote computing environment. The data may be single variable (e.g., one sensor) or multivariate (e.g., multiple sensors). In some cases, the multivariate data may include multiple variables of different types of data (pressure, velocity, temperature, etc.). As another example, multivariate data may include the same variable measured from different locations with respect to an asset.

As described in various examples herein, data may include a raw collection of related values of an asset or a process/operation including the asset, for example, in the form of a stream (in motion) or in a data storage system (at rest). Individual data values may include descriptive metadata as to a source of the data and an order in which the data was received, but may not be explicitly correlated. Information may refer to a related collection of data which is imputed to represent meaningful facts about an identified subject. As a non-limiting example, information may be a dataset such as a dataset which has been determined to represent temperature fluctuations of a machine part over time.

FIG. 1 illustrates a cloud computing system 100 for industrial software and hardware in accordance with an example embodiment. FIG. 1 is shown as a non-limiting example of a system where time-series data can be collected and searched. Referring to FIG. 1, the system 100 includes a plurality of assets 110 which may be included within an edge of an IIoT and which may transmit raw data to a source such as cloud computing platform 120 where it may be stored and processed. It should also be appreciated that the cloud platform 120 in FIG. 1 may be replaced with or supplemented by a non-cloud based platform such as a server, an on-premises computing system, and the like. Assets 110 may include hardware/structural assets such as machine and equipment used in industry, healthcare, manufacturing, energy, transportation, and that like. It should also be appreciated that assets 110 may include software, processes, actors, resources, and the like.

The data transmitted by the assets 110 and received by the cloud platform 120 may include raw time-series data output as a result of the operation of the assets 110, and the like. Data that is stored and processed by the cloud platform 120 may be output in some meaningful way to user devices 130. In the example of FIG. 1, the assets 110, cloud platform 120, and user devices 130 may be connected to each other via a network such as the Internet, a private network, a wired network, a wireless network, etc. Also, the user devices 130 may interact with software hosted by and deployed on the cloud platform 120 in order to receive data from and control operation of the assets 110.

Software and hardware systems can be used to enhance or otherwise used in conjunction with the operation of an asset and may be hosted by the cloud platform 120, and may interact with the assets 110. For example, ML models (or AI models) may be used to optimize a performance of an asset or data coming in from the asset. As another example, the ML models may be used to predict, analyze, control, manage, or otherwise interact with the asset and components (software and hardware) thereof. The ML models may also be stored in the cloud platform 120 and/or at the edge (e.g. asset computing systems, edge PC's, asset controllers, etc.)

The user device 130 may receive views of data or other information about the asset as the data is processed via one or more applications hosted by the cloud platform 120. For example, the user device 130 may receive graph-based results, diagrams, charts, warnings, measurements, power levels, and the like. As another example, the user device 130 may display a temporal user interface that allows a user thereof to input commands to an asset via one or more applications hosted by the cloud platform 120.

Information from the assets 110 may be communicated to the cloud platform 120. For example, external sensors can be used to sense information about a function, process, operation, etc., of an asset, or to sense information about an environment condition at or around an asset, a worker, a downtime, a machine or equipment maintenance, and the like. The external sensor can be configured for data communication with the cloud platform 120 which can be configured to store the raw sensor information and transfer the raw sensor information to the user devices 130 where it can be accessed by users, applications, systems, and the like, for further processing. Furthermore, an operation of the assets 110 may be enhanced or otherwise controlled by a user inputting commands though an application hosted by the cloud platform 120 or other remote host platform such as a web server. The data provided from the assets 110 may include time-series data or other types of data associated with the operations being performed by the assets 110

Industrial data or asset-related data may include time-series data that has been sensed by one or more sensors that are attached to an asset, sensors positioned within a surrounding environment of an asset, and the like. Asset-related data may include time-series data such as pressure, velocity, temperature, rotational force, noise (audio), humidity, and many others. Often, situations arise when an operator (or other user) desires to search for similar patterns of time-series data within historical time-series data. The example embodiments provide a system that can implement a search process without the need for comparing distance measures between two time-series segments. Instead, the example embodiments provide a system that performs a text-based search using a string of symbols.

Figure 2A:
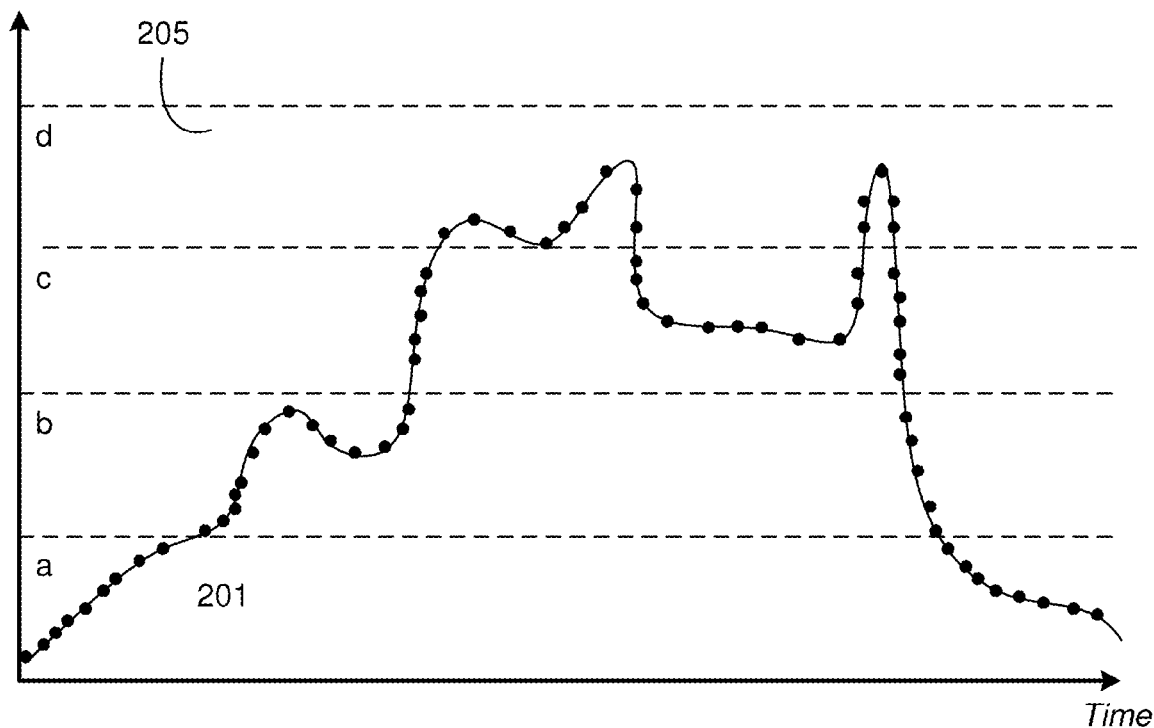
FIG. 2A is a diagram illustrating a process of transforming a temporal pattern into a string of symbols in accordance with example embodiments.

FIG. 2A illustrates a process of transforming a temporal pattern into a string of symbols 210 in accordance with example embodiments. Referring to FIG. 2A, a time-series graph 200 illustrates a measurement of time-series data in the form of a continuous line 201 also referred to as a temporal pattern. In this example, the time-series data is a measurement of temperature over time. It should be appreciated that a user may select particular segments of the line 201 for search. However, for convenience, in this example, the entirety of the line 201 is converted to the symbol string 210. In other words, the line 201 represents the temporal pattern to be searched.

In response, the system may convert the line 201 into the string of symbols 210 based on bins 205 set for the graph 200. The bins 200 are horizontal lines in this example which divide the graph into four bins where each bin is associated with a letter identifier A, B, C, and D. In this example, each bin is roughly the same size. However, it should be appreciated that the bins may be of different sizes with respect to each other. The size of the bins may be determined during a learning phase based on a frequency of data points of the line 201. For example, areas of the graph in which more data points are concentrated may have smaller bins, while areas of the graph in which data points are sparsely concentrated may have larger bins.

According to various embodiments, a symbol is generated for each datapoint using the bin identifier (A, B, C, D, etc.) of the bin the data falls into. The result is a lossy compression of the temporal pattern into a sequence of symbols. For example, when bin A is visited five times followed by bin B being visited 3 times, a symbol sequence "aaaaabbb" may be generated. As the graph changes over time, the line (data points) may move from one bin to another. Each time a time-series data point is processed; a new symbol may be generated.

Then, the next step compresses the obtained symbol sequence into a letter and a number representation where each letter corresponds to the observed symbol and the number is the contiguous repeat count for that symbol (e.g., a5, b3, etc. for the sequence in the above example), abstracting the time-series data into a sequence of alphanumeric symbols.

In the example of FIG. 2A, the line 201 of graph 200 is converted into the symbol string 210 which includes a value of a11, b16, c5, d9, c13, d4, c5, b5, and a8. To make the symbol string more flexible during the search stage, the system may scale the alphanumeric values, or the repeat counts, of each symbol to allow for approximate matches along the time-axis. In the example of FIG. 2A, the symbol string 210 may be scaled to the scaled string 220. In this case, the scaling ratio is 5 to 1, with a rounding off occurring to the nearest integer value. For example, the number 11 may be scaled to 2.2 (i.e., 11 divided by 5). In this example, the remainder of 0.2 may be scaled down to zero and thus the number 2.2 may be rounded off to 2. In contrast, if the number was 2.6, it could be rounded up to the number 3, etc.

Figure 2B:
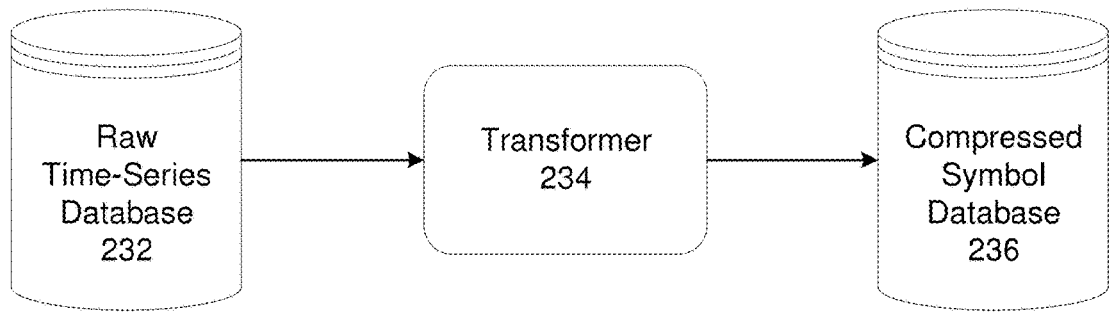
FIGS. 2B and 2C are diagrams illustrating transformation and query processing using a time-series database and a symbol database in accordance with example embodiments.

FIG. 2B illustrates a process 230 of a transformer 234 performing a learning phase during which raw time-series temporal patterns stored in a raw time-series database 232 are transformed (i.e., compressed) into symbol strings and stored in symbol-database 236. Here, the transformer 234 may determine the optimal discretization bin boundaries from the raw time-series patterns stored in the time-series database 232. The bin boundaries may be optimally determined so as to retain the most amount of original information when the data is converted to the symbols via discretization. For example, if data points typically cluster in certain regions of the data range, then more bins may be used in those parts to retain more fidelity. Meanwhile, if less data points are found at other parts of the data-space, less bins may be used. Therefore, making an optimal use of the total vocabulary of symbols. When a new pattern is received (such as a search pattern), the previously determined bin boundaries may be used for the new data pattern.

When the discretization bins are determined, the transformer 234 may convert raw time-series temporal patterns stored in the time-series database 232 into strings of symbols based on the discretization bins. Furthermore, the compressed symbol strings may be stored in the symbol database 236 where they may be accessed during a subsequent search process. Here, the transformer 234 may scale-down the strings of symbols into more flexible representations during the search stage.

Figure 2C:
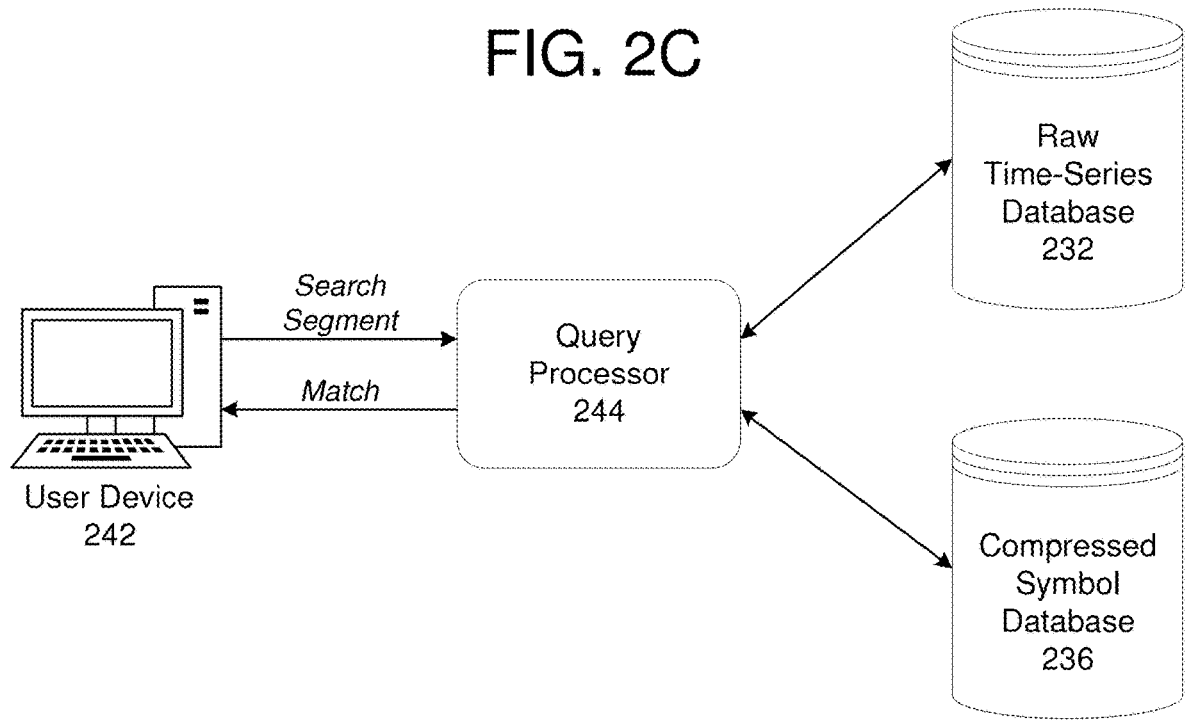

FIG. 2C illustrates a process 240 of a search being performed for a time-series segment provided from a user device 242. In this case, a query processor 244 may convert the time-series segment into discretized format for search using the discretization bins determined during the learning process 230 in FIG. 2B. When the segment has been converted into a discretized representation, the query processor 244 may search the symbol database 236 for matching or similar symbolic patterns. Here, before performing the search, the query processor may further scale down the string of symbols such as shown in the example of FIG. 2A.

When a matching string of symbols is found in the symbol database 236, the query processor 244 may retrieve raw data corresponding to the matched string from the time-series database 232. Furthermore, the query processor 244 may output the original time-series pattern (or other information) as a search results to a user interface displayed on the user device 242.

In some embodiments, the transformer 234 and the query processor 244 may be disposed on distributed systems such as a Spark or Hadoop cluster. Therefore, the distributed systems can process multiple queries (or multiple variables of a multivariate query) at the same time thereby improving processing speed. Furthermore, the time-series database 232 and the symbol database 236 may be distributed databases or file systems.

FIG. 2D, illustrates another example of a system 250 for performing a time-series pattern search. Referring to FIG. 2D, the system 250 includes a symbolic transformer 252, a symbolic pattern search 253, a symbolic database 254, and a time-series database 255. The system 250 may be implemented by using a database, a web server, a user device, a cloud platform, or the like. The time-series DB 255 may store the original time-series data of an input/selected temporal pattern 251. The symbolic transformer 252 may receive the temporal pattern 251 and convert it into a string of symbols. Meanwhile, the symbolic time-series DB 254 may store previous temporal patterns which have been transformed into strings of symbols. The symbolic pattern search module 253 may identify any previously stored patterns with the input temporal pattern 251 which has been converted to a string of symbols. Here, the symbolic pattern search 253 may identify strings that match, and forward an identifier of the matching pattern to the time-series DB 255 where the raw time-series data corresponding to the matched pattern can be retrieved and output in 256. The result is an output that includes a previously stored temporal pattern that is similar in shape, size, etc., as the input temporal pattern without the need for performing raw data based search.

In this example, the two databases (symbolic DB 254 and time-series DB 255) may store data as a key-value pairs, where the key is an identifier (e.g., an asset and sensor) and the value is the continuous time-series and symbolic time-series data, respectively. The symbolic transformer converts continuous data in the time-series DB 255 to the symbolic domain which is stored in symbolic DB 254. At run-time, a query time-series segment is submitted, (e.g., via a graphical user interface or a command line interface) specifying the sensors and the query segment data. Query data is converted to symbolic representation using the symbolic transformer 252, then a text search approach is used to find matches against symbolic candidates in the symbolic DB 254. The match parameters (e.g., the keys of the matched time-series and the temporal location of all matches), are returned, which are then used to fetch the corresponding continuous data (temporal pattern 256) from the time-series DB 255 and returned and/or output as query results on the screen.

In some embodiments, the symbolic transformer 252 may convert continuous time-series data (input 251) to a compressed symbolic sequence typically leading to several orders of magnitude in compression reducing the size of the search space. This conversion, done for data from each sensors in a multivariate case, may be performed based on the following steps including: (1) empirical probability density estimation for each the sensor, (2) using this density and constrained optimization to get discretization boundaries that minimize the reconstruction loss of symbolic representation, (3) using the discretization boundaries, to obtain a symbolic time-series for each sensor, by mapping the continuous domain data to symbols corresponding to each discretization bin, and (4) symbolic time series compression utilizing the redundancies created due to symbolization to create alphanumeric symbols composed of a symbol and its contiguous repeat count. Each alphanumeric symbol marks a transition point in the symbolic time-series abstracting the shape of the original time-series as a list of piece-wise constant segments. A temporal scaling of the contiguous repeat count can be done at run-time to allow approximate matches in the temporal sense.

At run time, the input query time-series segment 251 may be converted to a compressed symbolic representation using alphanumeric symbols for each sensor. In the multivariate case, the compressed symbolic representation for query sensors may be converted to a product symbolic representation to abstract the multivariate time-series pattern. This may be done by finding the union of all transition points in each sensor to create a product symbolic representation. In this case, each symbol in the product representation may be the Cartesian product of symbols from each sensor, and its value may be the corresponding repeat count. Thereby, abstracting the multivariate time-series as sequence of multivariate piece-wise constant segments. Given the chosen query sensors, product symbolic construction may also done for the compressed symbolic time-series stored in the symbolic DB 254. The symbolic query may be searched for a match over the candidates in the symbolic DB 254 using a text search approach such as regular expressions.

FIG. 3 illustrates a search process 300 for a time-series data pattern in accordance with an example embodiment. Referring to FIG. 3, a user interface displays a graph 310 of time-series data. Here, a user may select a search segment 312 from the graph 310. The selection may be performed via an input mechanism. In this example, the segment 312 is only a portion but not all of the line graph 310. In response, a search system 320 may detect the selection of search segment 312, and transform the search segment 312 into a string 314.

Next, the search system 320 may attempt to identify any similar temporal patterns previously stored which include a segment that matches the selected segment 312 based on the transformed string 314. Here, the search system 320 identifies a matched string 334 corresponding to a matched portion 332 of a graph 330. The search system 320 may retrieve the graph 330 that corresponds to the string 334. In this example, the graph 330 is not identical to the graph 310. However, the matched portion 332 is similar to the selected segment 312. Therefore, the graph 330 is determined as an output/result of the search query performed based on the selected segment 312.

The system is flexible because the symbolic abstraction used by the system can codify a vast array of temporal patterns of varying lengths and forms making query specification easy. The system is extensible in that it extends naturally to multivariate temporal patterns for multivariate search via product construction of compressed symbol sequences. The system is composable in that complex temporal patterns that are compositions of multivariate temporal patterns can be queried and searched. Furthermore, the system is scalable because it scales naturally to large datasets as the algorithm is inherently data parallel. Unique technical features that enable the system are (1) symbolic transformation for scalable transformation and search of time-series data, (2) optimal discretization to minimize the loss during symbolic transformation, (3) product pattern construction to construct multivariate temporal patterns from the compressed symbolic representation, and (4) text-based search of time-series data for searching complex patterns.

Figure 4:
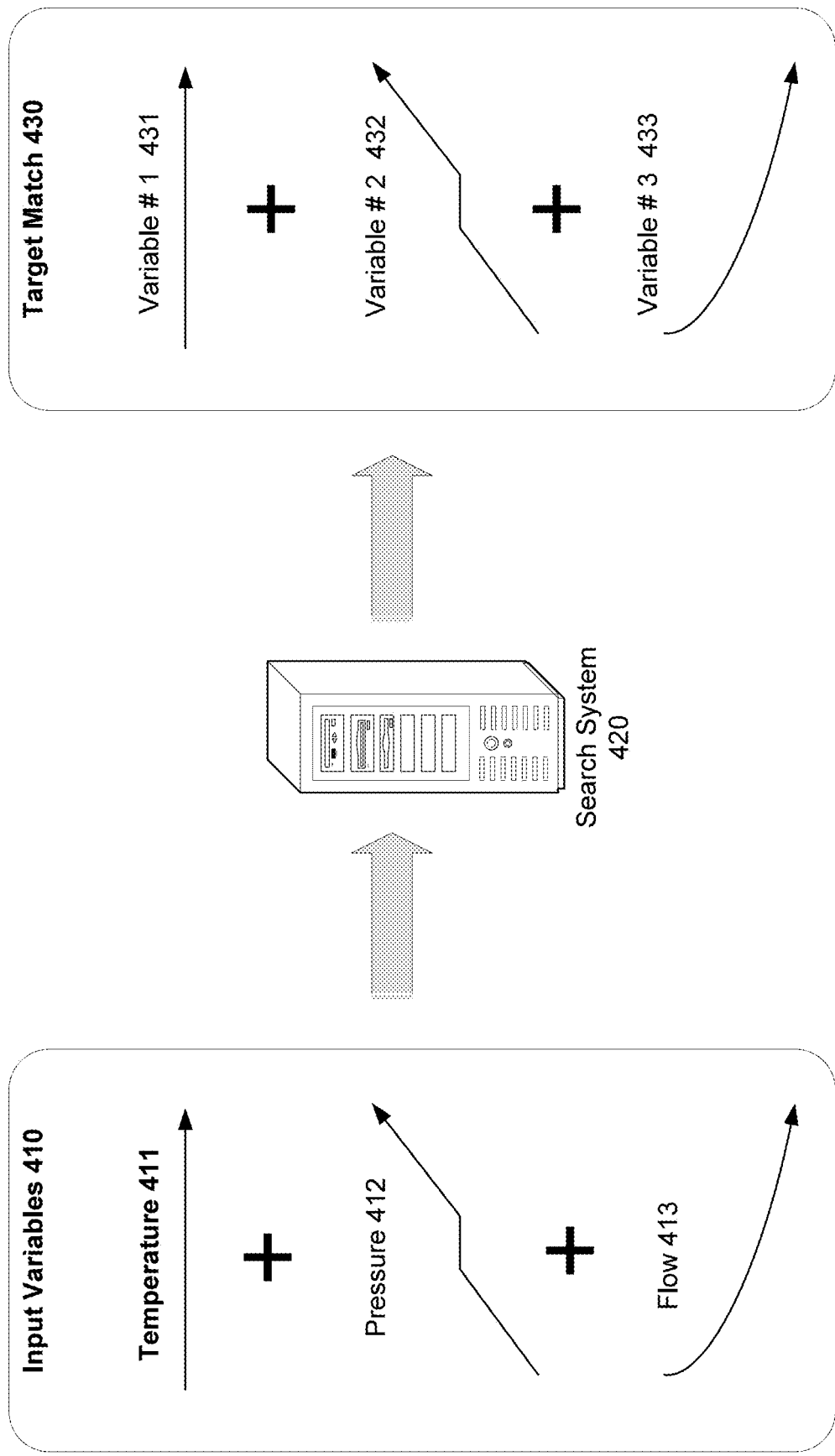
FIG. 4 is a diagram illustrating a search process for a multivariate time-series data pattern in accordance with an example embodiment.

FIG. 4 illustrates a search process 400 for a multivariate time-series data pattern in accordance with an example embodiment. For example, the process 400 may be performed by a computing system such as a server, a cloud platform, a database, or the like. In the example of FIG. 4, a multivariate search is performed based on three input variables 411, 412, and 413, of time-series data. The user may designate the three input variables in advance. When the user selects a range of time on the screen of a first variable (e.g., temperature 411), the system may identify corresponding ranges of time from the other input variables (e.g., pressure 412 and flow 413). Therefore, the system 420 may search for similar multivariate patterns in other multivariate datasets.

In these multivariate examples, there may be some relationship between the different sensors. For example, the three sensors in FIG. 4 could be measuring different variables (temperature 411, pressure 412, and flow 413) in association with the same industrial asset. As another example, it could be three sensors measuring the same thing but at different positions with respect to the asset. The algorithm only cares about the temporal patterns in each sensor and the relationship between these sensors, the patterns returned after search are the same or similar to the query segment. Patterns may be variable A is going up at a certain rate while variable B is going up at a certain rate, etc. The system 420 then looks for multivariate patterns where such requested patterns hold (including the relationships between sensors). The search may be performed over multiple assets instead of just a single asset. When a multivariate search is performed the system 420 may identify matches that satisfy all three (or multiple) variables.

Figure 5:
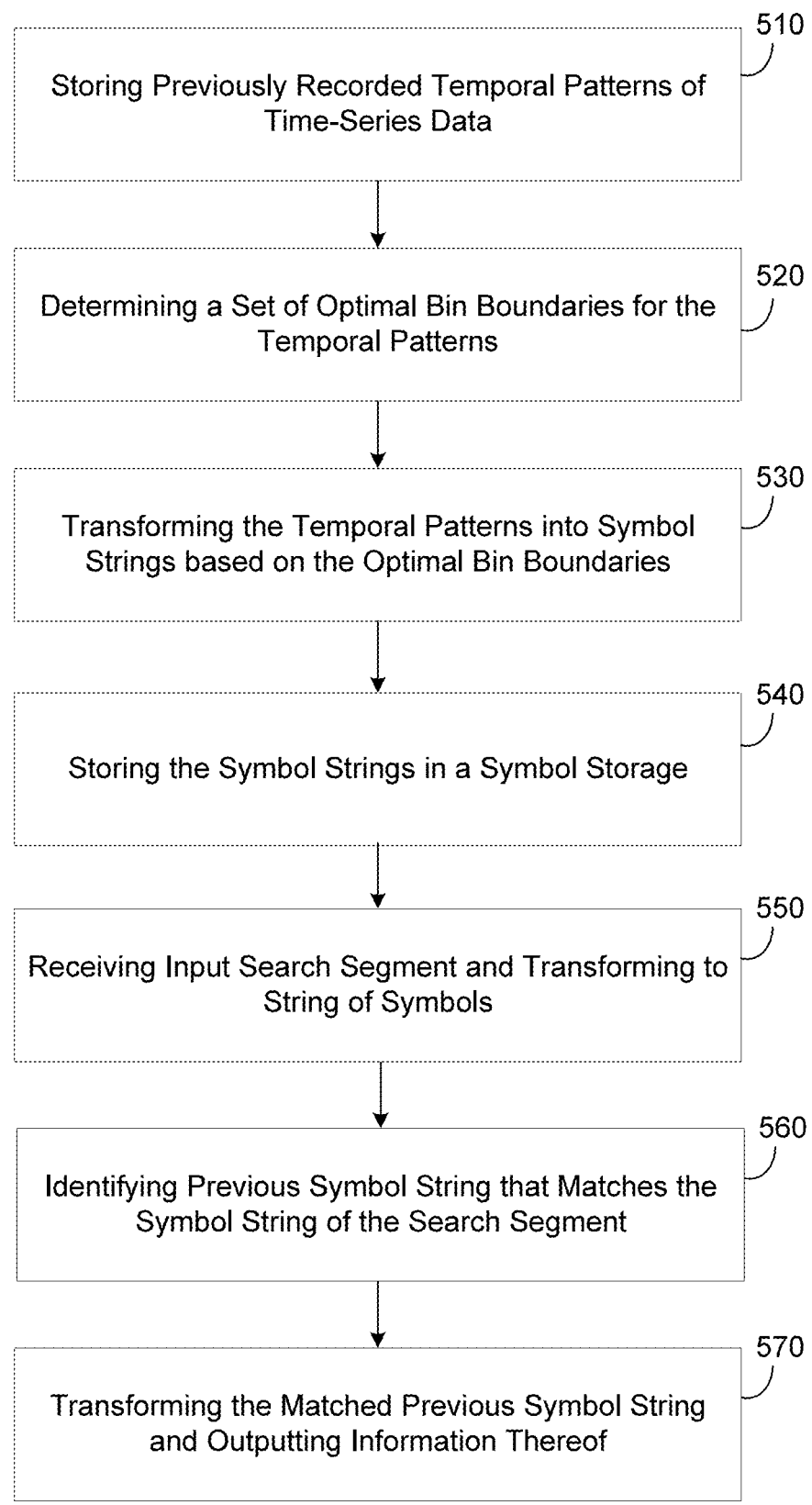
FIG. 5 is a diagram illustrating a method for generating search results for a temporal pattern of time-series data in accordance with an example embodiment.

FIG. 5 illustrates a method 500 for generating search results for a temporal pattern of time-series data in accordance with an example embodiment. For example, the method 500 may be performed by a database, a cloud platform, a server, a user device, a combination of devices, and the like. Referring to FIG. 5, in 510, the method may include storing previously recorded temporal patterns of time-series data. The previously recorded temporal patterns may include representations of time-series data on a graph.

In 520, the method may include determining a set of optimal bin boundaries based on the previously recorded temporal patterns, where the set of optimal bin boundaries divide a temporal pattern of time-series data into a plurality of discrete bins each labeled with a respective symbol. Here, the same set of optimal bin boundaries may be used for each of the previously recorded temporal patterns. The set of bin boundaries may be generated based on a function which prevents or otherwise limits data loss due to compression.

In 530, the method may include transforming the previously recorded temporal patterns of time-series data into symbol strings based on the set of optimal bin boundaries, where a symbol string is based on data points in the plurality of discrete bins. Here, each symbol string may include a sequence of symbol identifiers and a number representing the number of contiguous data points in a bin corresponding to the symbol. Furthermore, in 540 the method may include storing the symbol strings within a symbol storage.

In some embodiments, in 550, the method may further include detecting an input of a search segment of a temporal time-series data pattern to be searched, and transforming the search segment into a symbol string to be searched based on the set of optimal bin boundaries. In some embodiments, in 560 the method may further include identifying a symbol string of a previously recorded temporal pattern included in the stored symbol strings that matches the symbol string of the search segment. In some embodiments, in 570 the method may further include converting the identified symbol string of the previously recorded temporal pattern into an original temporal pattern, and output information about the original temporal pattern for display.

Furthermore, the identifying may include identifying a similar multivariate pattern that is included in a previously stored multivariate dataset based on the plurality of strings of symbols. Here, the relationships between the variables in the multivariate search must be held true. For example, if pressure is going up while temperature is going down, then the system must find matches were pressure variable is going up while the temperature variable is going down in a similar manner.

Figure 6:
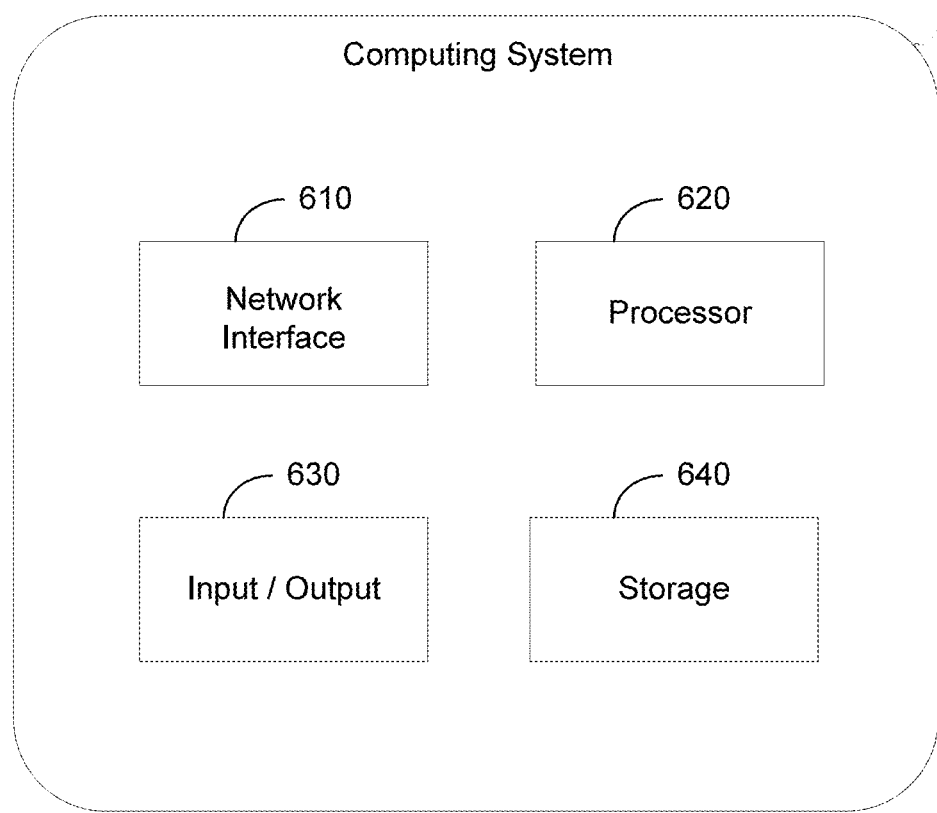
FIG. 6 is a diagram illustrating a computing system for use with any of the example embodiments.

FIG. 6 illustrates a computing system 600 in accordance with an example embodiment. For example, the computing system 600 may be a cloud platform, a server, a user device, or some other computing device with a processor. Also, the computing system 600 may perform the method of FIG. 5. Referring to FIG. 6, the computing system 600 includes a network interface 610, a processor 620, an input/output 630, and a storage device 640. Although not shown in FIG. 6, the computing system 600 may include other components such as a display, a microphone, a receiver/transmitter, and the like. In some embodiments, the processor 620 may be used to control or otherwise replace the operation of any of the components of the computing system 600.

The network interface 610 may transmit and receive data over a network such as the Internet, a private network, a public network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. The input/output 630 may be a hardware device that includes one or more of a port, an interface, a cable, etc., that can receive data input and output data to (e.g., to an embedded display of the device 600, an externally connected display, an adjacent computing device, a cloud platform, a printer, an input unit, and the like. The storage device 640 is not limited to any particular storage device and may include any known memory device such as RAM, ROM, hard disk, distributed storage and the like. In some embodiments, the storage 640 may be configured and reconfigured based on a predetermined partitioning scheme, a subsequent re-partitioning scheme, and the like.

According to various embodiments, the storage 640 may store previously recorded temporal patterns of time-series data. For example, the previously recorded temporal patterns may be stored in a temporal data store. The processor 620 may determine a set of optimal bin boundaries based on the previously recorded temporal patterns. For example, set of optimal bin boundaries may include a plurality of thresholds that divide the observed range of time-series data into a plurality of discrete bins each labeled with a respective symbol. The processor 620 may transform the previously recorded temporal patterns of time-series data into symbol strings based on the set of optimal bin boundaries, where a symbol string is based on data points in the plurality of discrete bins. Further, the processor 620 may store the symbol strings within a symbol storage included in storage 640.

In some embodiments, the processor 620 may detect an input of a search segment of a time-series data to be searched, and transform the search segment into a symbol string to be searched based on the set of optimal bin boundaries. In some embodiments, the processor 620 may identify a symbol string of a previously recorded temporal pattern included in the stored symbol strings that matches the symbol string of the search segment. In some embodiments, the processor 620 may convert the identified symbol string of the previously recorded temporal pattern into an original raw time-series data, and output information about the retrieved temporal pattern for display.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a first database for storing received time-series data formed of clusters of data points within regions of the data;
   a processor configured to divide the stored data into discrete bins, each bin being (i) defined by boundaries based on a frequency of the data points occurring within the regions and (ii) associated with a unique bin identifier;
   wherein the processor is further configured to convert the data within the boundaries into a symbol string (i) including the unique bin identifiers and (ii) representing a temporal pattern; and
   a second database for storing the temporal pattern, the stored temporal patterns being searchable via comparison with a segment of a temporal pattern to be searched;
   wherein the processor is further configured to:
   execute a lossy compression function to determine a size for each bin based on a number of contiguous data points of the temporal pattern;
   compress the symbol string to generate an alphanumeric string comprising a letter and a number representation, wherein each letter represents the respective symbol and each number represents the number of contiguous data points; and
   generate a scaled string by scaling the alphanumeric string based on a scaling ratio.

2. The computing system of claim 1, wherein the processor is further configured to scale the value of each alphanumeric symbol to a less precise value based on the scaling ratio.

3. The computing system of claim 1, wherein the processor is configured to receive a selection of segments from a plurality of temporal patterns of multivariate time-series data, where the plurality of temporal patterns corresponds to a plurality of variables in a multivariate dataset.

4. The computing system of claim 3, wherein the processor is configured to identify a similar multivariate pattern that is included in a previously stored multivariate dataset stored in the symbol storage based on the plurality of strings of symbols.

5. The computing system of claim 1, wherein the processor is further configured to determine when the comparing of the stored temporal pattern with the segment produces a match.

6. The computing system of claim 1, wherein the stored temporal patterns of time-series data were sensed by Internet of Things (IoT) sensors.

7. The computing system of claim 1, wherein the processor is disposed at a cloud platform.

8. A non-transitory computer-readable medium comprising instructions which when executed by a processor cause a computer to perform a method comprising:
   storing, in a first database, received time-series data formed of clusters of data points within regions of the data;
   dividing, via a processor, the stored data into discrete bins, each bin being (i) defined by boundaries based on a frequency of the data points occurring within the regions and (ii) associated with a unique bin identifier;
   converting, via the processor, the data within the boundaries into a symbol string (i) including the unique bin identifiers and (ii) representing a temporal pattern;
   storing, in a second database the temporal pattern, the stored temporal patterns being searchable via comparison with a segment of a temporal pattern to be searched;
   executing by the processor a lossy compression function to determine a size for each bin based on a number of contiguous data points of the temporal pattern;
   compressing by the processor the symbol string to generate an alphanumeric string comprising a letter and a number representation, wherein each letter represents the respective symbol and each number represents the number of contiguous data point; and
   generating a scaled string by scaling the alphanumeric string based on a scaling ratio.

9. The method of claim 8, further comprising scaling the numeric value of each alphanumeric symbol to a less precise value based on the scaling ratio.

10. The method of claim 8, further comprising receiving a selection of segments from a plurality of temporal patterns of multivariate time-series data, where the plurality of temporal patterns corresponds to a plurality of variables in a multivariate dataset.

11. The method of claim 10, further comprising identifying a similar multivariate pattern that is included in a previously stored multivariate dataset stored in the symbol storage based on the plurality of strings of symbols.

12. The non-transitory computer-readable medium of claim 8, further comprising determining, via the processor, when the comparing of the stored temporal pattern with the segment produces a match.

13. The non-transitory computer-readable medium of claim 8, wherein the stored temporal patterns of time-series data were sensed by Internet of Things (IoT) sensors.

14. The non-transitory computer-readable medium of claim 8, wherein the method is performed at a cloud platform.

15. A computing system comprising:
   a storage to store previously recorded temporal patterns of time-series data;
   a processor configured to determine a set of optimal bin boundaries based on the previously recorded temporal patterns, where the set of optimal bin boundaries divide the observed range of time-series data into a plurality of discrete bins each labeled with a respective symbol, and transform the previously recorded temporal patterns of time-series data into symbol strings based on the set of optimal bin boundaries, where a symbol string is based on data points in the plurality of discrete bins,
   wherein the processor is further configured to store the symbol strings within a symbol storage; and
   wherein the processor is further configured to:
   execute a lossy compression function to determine a size for each bin based on a number of contiguous data points of the temporal pattern;
   compress the symbol string to generate an alphanumeric string comprising a letter and a number representation, wherein each letter represents the respective symbol and each number represents the number of contiguous data points; and
   generate a scaled string by scaling the alphanumeric string based on a scaling ratio.

16. The system of claim 15, wherein the processor is further configured to scale the value of each alphanumeric symbol to a less precise value based on the scaling ratio.

17. The system of claim 15, wherein the previously recorded temporal patterns of time-series data were sensed by Internet of Things (IoT) sensors.

18. The system of claim 15, wherein the processor is disposed at a cloud platform.

\* \* \* \* \*